US006435035B1

(12) United States Patent
Kubsik et al.

(10) Patent No.: US 6,435,035 B1
(45) Date of Patent: Aug. 20, 2002

(54) CHAIN TENSION MONITORING APPARATUS AND METHOD

(75) Inventors: Robert Kubsik, W. Bloomfield, MI (US); Dan Carter, Parkville, MO (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 09/447,275

(22) Filed: Nov. 23, 1999

(51) Int. Cl.⁷ .............................................. G01N 29/00
(52) U.S. Cl. ...................................................... 73/828
(58) Field of Search ..................... 73/818, 825, 826, 73/828, 843, 161, 827

(56) References Cited

U.S. PATENT DOCUMENTS

| | | |
|---|---|---|
| 2,918,020 A | 12/1959 | Henderson et al. |
| 4,222,481 A | 9/1980 | Dehne et al. |
| 4,587,852 A | 5/1986 | Butler et al. |
| 4,657,131 A | 4/1987 | Brychta |
| 4,690,065 A * | 9/1987 | Belanger et al. ......... 104/172.3 |
| 5,168,979 A * | 12/1992 | Iversen ........................ 198/781 |
| 5,195,630 A * | 3/1993 | Donovan et al. ........ 198/465.3 |
| 5,641,058 A | 6/1997 | Merten et al. |

OTHER PUBLICATIONS

Jervis B. Webb Overhead catalog, 1997, pp. 3, and 72–85.
"Rotary Caterpillar Drive", Jervis B. Webb Company publication, Apr. 1997.
"Webb Overhead Conveyor Components And Their Application Into a Conveyor System", Jervis B. Webb Company catalog, pp. 72–83.

* cited by examiner

Primary Examiner—Max Noori
(74) Attorney, Agent, or Firm—Dickinson Wright PLLC

(57) ABSTRACT

A chain tension monitoring apparatus and method includes a conveyor drive having a fixed frame and a floating frame. The floating frame supports a conveyor drive unit and is biased against the fixed frame by a compression spring to oppose forces generated by the conveyor drive operation. A force sensor is mounted to the floating frame to sense chain pull applied thereto. A pre-compression load is applied to the force sensor and chain pull is monitored as a function of the pre-compression load and actual load sensed by the force sensor.

21 Claims, 4 Drawing Sheets

CHAIN TENSION MONITORING APPARATUS AND METHOD

FIELD OF THE INVENTION

The present invention is directed to an apparatus and method for monitoring chain pull or tension, and in particular, to the use of a load cell-type force sensor positioned between components of a chain drive for tension monitoring.

BACKGROUND ART

Conveyor systems using chains as the driving mechanism and chain drives to give the conveyor motion and control conveyor speed are well known in the art. One example of these types of conveyor systems is a power and free system. Power and free systems are generally made up of a power track, a free track, and trolleys capable of travelling along the free track, the trolleys supporting one or more carriers. Each carrier then supports a load or article being conveyed. The trolleys are usually divided into leading and trailing trolleys. Each leading trolley in a power and free system includes a driving dog portion which extends towards the power track and which is engageable by a pusher dog carried by a moving chain on the power track. When the pusher dog and the driving dog are engaged, the leading or drive trolleys push along the free track by the moving power chain. When the driving dog is retracted, or otherwise disengaged from the pusher dog, the trolley stops moving, thus halting the carrier.

To move the power chain, one or more conveyor drives are utilized. Two typical types include caterpillar and sprocket versions. A sprocket drive delivers motion to the conveyor chain directly from the output side of a reducer through a sprocket whose teeth mesh with the lengths of the conveyor chain. A caterpillar drive transmits its driving force to the conveyor by means of a caterpillar chain made of precision steel rollers with driving dogs that mesh with the lengths of the conveyor chain. Depending on the size of the conveyor system, the drives can provide chain pulls of up to 12,000 pounds.

Caterpillar drives come generally in junior or standard categories. The smaller drives can be designed with either a fixed frame or a floating frame. Larger drives generally use floating frames. Caterpillar drives are usually installed along any horizontal straight run of a conveyor track.

Standard floating drives can be either a linear type or a rotary type. The linear type is generally built with an inner floating frame that is guided and supported by ball bearing wheels attached to an outer fixed frame. In contrast, a rotary drive is mounted on an inner floating frame that pivots around a reducer output shaft, the floating frame acting as a torque arm against the fixed outer frame. One or more compact coil springs counterbalance the normal chain pull and control the movement of the floating frame.

One example of a conveyor drive is disclosed in U.S. Pat. No. 4,222,481 to Dehne et al., hereby incorporated in its entirety by reference. With particular reference to FIGS. 7 and 8 of this patent, pivotal movement of the floating frame is easily opposed by a compression spring. The compression spring is arranged between a plate attached to the moveable frame and another plate secured to the fixed frame. The force of the compression spring biases the movable frame against the torque caused by drive pull. The Dehne et al. patent also discloses a shock absorber to further restrain pivotal movement of the frame. The shock absorber is mounted in a similar fashion as the compression spring, the absorber being arranged between the floating frame and the fixed frame.

The Dehne et al. patent also teaches that a limit switch can be provided to provide overload protection in case of excessive pivotal movement of the floating frame, such caused by a chain jam or the like.

Another prior art conveyor drive is disclosed in FIG. 1 and designated by the reference numeral 10., The drive is depicted in the same view as FIG. 4 of the Dehne et al. patent. Shown is a reducer 1, a reducer shaft 3, a bearing 5, and a drive sprocket 7. FIG. 1 does not show the caterpillar chain around the drive sprocket 7.

FIG. 1 also shows an I-beam 9 which provides support for the trolley of a power and free system. The driven chain of the power and free system travels in a direction perpendicular to the view shown in FIG. 1 and in a direction from the motor (not shown) towards the reducer 1.

The reducer 1 is also shown with an input shaft 11 and pulley 13. The reducer 1 is connected to the motor via components 11 and 13 in a conventional fashion.

The speed reducer 1 is supported by a floating frame 15, similar to the manner of support described in the Dehne et al. patent. The FIG. 1 embodiment uses a torque arm assembly 17 and a compression screw 19 to monitor the chain pull on the conveyor drive. The torque arm assembly 17 includes a rod 18, a compression spring 21 and a rod plate 25. One end of the rod 18 is attached to the fixed frame 27. The other end of the rod 18 is secured to the plate 25. The spring 21 is interposed between the plate 25 and a bracket 23 attached to the floating frame 15. In this configuration, the spring 21 biases the floating frame 15 in the direction A, in opposition to the drive torque occurring in the direction B.

The rod 18 has a strain gauge sensor 29 as a part thereof, the strain gauge sensor 29 monitoring the chain pull during conveyor operation. More particularly, the strain gauge sensor 29 is zeroed when the conveyor drive is at rest, i.e. zero chain pull. When the conveyor drive is operating and a drive torque B is applied to the floating frame 15, the amount of chain pull is monitored for conveyor operation control.

Another embodiment similar to FIG. 1 uses the torque arm assembly 17 without the strain gauge sensor 29, thereby relying on other methods and techniques to monitor chain pull. One such technique uses a strain gauge link as part of the conveyor chain itself. The gauge on the link is calibrated so that the output of the gauge corresponds to the tension in the conveyor chain. The conveyor chain is stopped and the link is installed in the chain, the link then travelling around the conveyor system. Output data can be collected either by an umbilical cord and a data recorder or can be stored in computer memory for later download. Although the data collected in this fashion can be analyzed to find potential problem spots in the system, this method does not allow for the collection of data at one point in the conveyor system over a long period of time.

There are advantages to looking at the pull exerted by the drive over a period of time such as with the FIG. 1 embodiment. One of the problems with this embodiment is that the strain gauge is incorporated into the drive frame. If the drive frame is redesigned for a new installation or use, the strain gauge must also be redesigned to fit the requirements of that particular drive. Alternatively, if the strain gauge is being added as a retrofit, an expensive and time consuming process is required to remove the torque arm and replace it with a strain gauge-containing torque arm assembly.

Consequently, a need has developed to provide simplified and improved methods and apparatus to monitor the chain pull in conveyor systems. The present invention solves this need by providing a simple but effective method to install a strain gauge on an existing conveyor as well as an improved conveyor drive apparatus. With the invention, the conveyor does not have to be stopped to install the strain gauge and must be stopped for just a short period of time for calibration.

SUMMARY OF THE INVENTION

Accordingly, it is a first object of the present invention to provide an improved chain tension monitoring apparatus.

Another object of the present invention is an apparatus for monitoring chain tension which is easily retrofitted on existing units.

A still further object of the present invention is a method and apparatus of monitoring chain tension using a force sensor that easily interfaces with a floating frame conveyor drive.

One other object of the present invention is a method and apparatus for monitoring chain pull which is easily installed and calibrated.

Other objects and advantages of the present invention will become apparent as a description thereof proceeds.

In satisfaction of the foregoing objects and advantages, the present invention provides an improvement in conveyor drives utilizing fixed and floating frames. In these types of conveyor drives, the floating frame supports a conveyor drive unit and the frame is biased against the fixed frame by a compression spring to oppose forces generated by the conveyor drive operation.

In accordance with the invention, a force sensor is arranged on a portion of the floating frame and is configured with respect to the compression spring to sense a maximum compression force when chain pull of the chain drive is zero. The floating frame can be a rotary type, a linear type, or other known conveyor drives utilizing floating frames. Preferably, the force sensor is a load cell sensor and the portion of the floating frame where the force sensor is located opposes a portion of the fixed frame.

In one embodiment, a clamp assembly can be used to assist in mounting the force sensor to the floating frame. In this embodiment, the clamp assembly can utilize a clamp plate which fixes the force sensor between the clamp plate and the floating frame. In this arrangement, the force of the floating frame against the force sensor is resisted by the fixed frame through the clamp plate.

The invention also includes a method of monitoring chain pull in a conveyor system that employs a conveyor drive using a fixed frame and a floating frame. The floating frame supports a conveyor drive unit, the floating frame biased against the fixed frame by one or more compression springs to oppose forces generated by drive operation. According to the inventive method, the force sensor contacts a portion of the floating frame. The force sensor is pre-compressed to a preset force level and the chain drive is operated to generate a given chain pull. Using the force sensor, the operating chain pull is measured for monitoring purposes.

The floating frame can either pivot about an axis thereof or move along its longitudinal axis. As part of the measuring step, the data generated by the force sensor can be stored in electronic form.

In one mode, the force sensor is arranged by first compressing the compression spring to create a space between the floating frame and the fixed frame. The force sensor is then inserted in the space and the compression spring is allowed to expand to fix the force sensor in place. During the insertion step, the conveyor drive can remain operating and only has to be stopped to measure a pre-compression load on the force sensor for ultimately calculating the chain pull when the chain drive is in operation.

BRIEF DESCRIPTION OF THE DRAWINGS

Reference is now made to the drawings of the invention wherein.

DESCRIPTION OF THE PREFERRED EMBODIMENTS

The present invention offers significant improvements in monitoring chain pull or chain tension for conveyor drives. In contrast to the tedious mechanisms of the prior art, the invention allows for a quick and easy way to monitor chain tension, either as retrofits of existing drives or for new installations.

Figure 1:
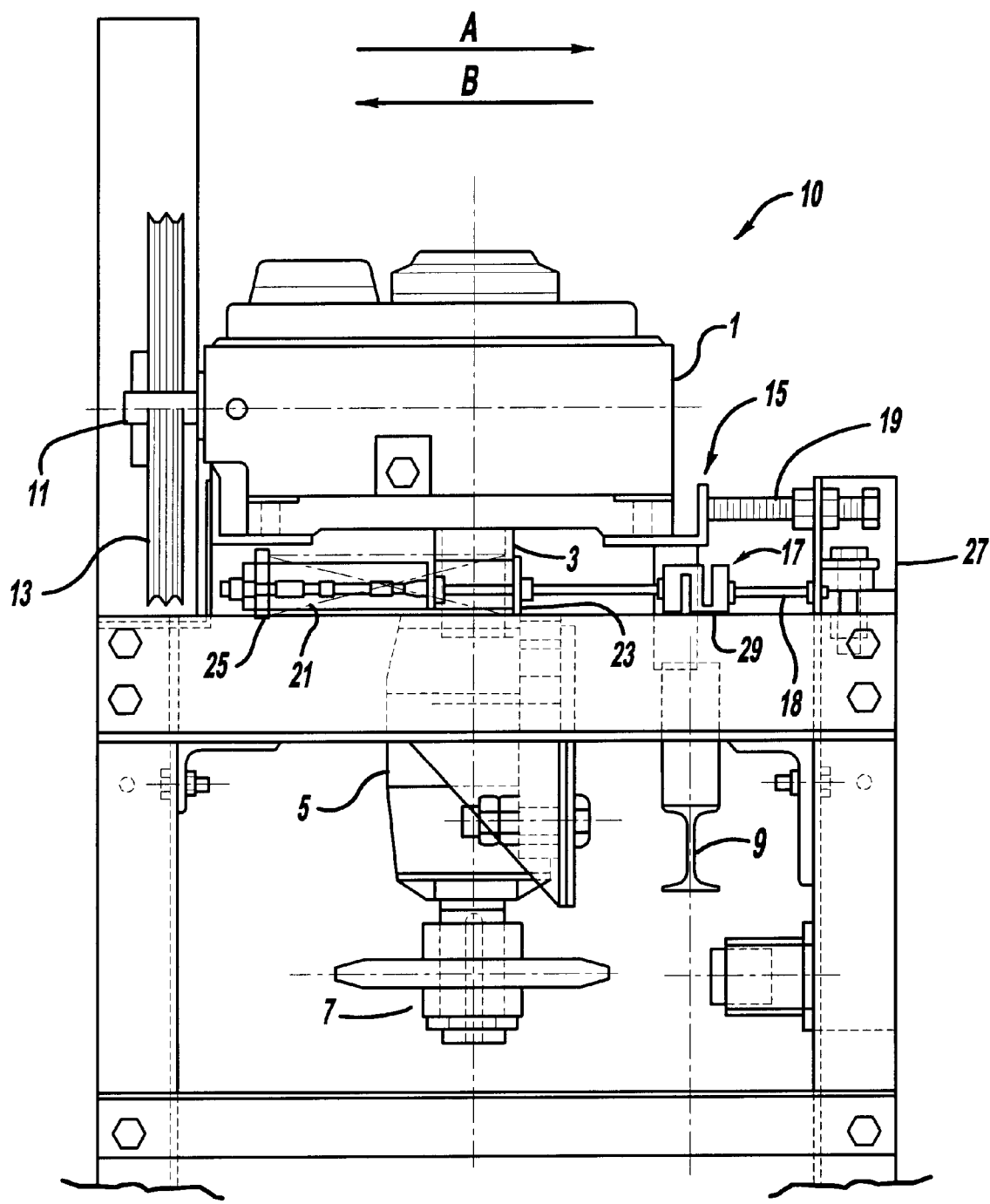
FIG. 1 shows a prior art conveyor drive employing a torque arm strain gauge sensor.
Figure 2:
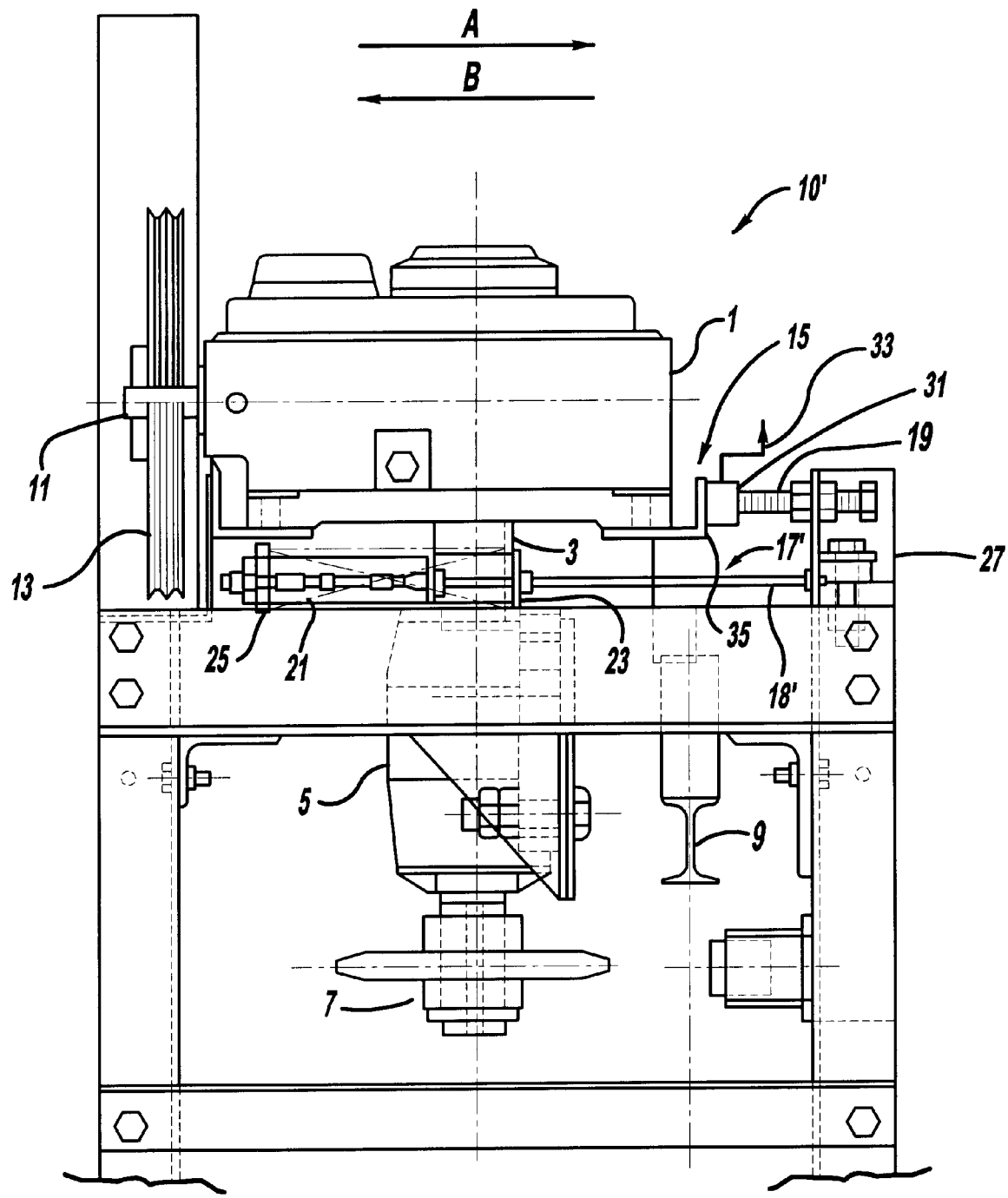
FIG. 2 shows a first embodiment of the invention as a conveyor drive using a force sensor.

FIG. 2 shows one embodiment of the invention. A conveyor drive designated by the reference numeral 10' is similar to that depicted in FIG. 1. The drive 10' differs from FIG. 1 by using a conventional torque arm assembly 17' which does not use the strain gauge sensor 29. The rod 18' then extends from the fixed frame 27 to the plate 25. It should be understood that other mechanisms could be used to resist the force applied to the conveyor drive structure other than the spring arrangement depicted in FIG. 2.

In substitution for the strain gauge sensor 29, a force sensor 31, preferably a load cell type such a button sensor is positioned between the compression screw 19 and the floating frame 15. Strain information, e.g., the chain pull force, is output via line 33 for recording, analysis, storage and the like.

Positioning the force sensor 31 between the compression screw 19 and the floating frame 15 provides significant advantages over conveyor drives lacking any strain gauge sensor and those that may be custom designed to a particular manufacturer's specifications. The force sensor 31 can be interposed between the floating frame and a compression screw or the like regardless of the conveyor drive configuration. Thus, no design modifications or new configurations must be developed for a given manufacturer's application. In addition, if a conveyor drive uses a standard torque arm assembly 17' as shown in FIG. 2, this assembly 17' does not have to be removed and replaced with a prior art design as shown in FIG. 1. Rather, the force sensor 31 can be utilized which makes the retrofit much easier than if a new sensor-containing torque arm assembly had to be installed in an existing drive.

Figure 3A:
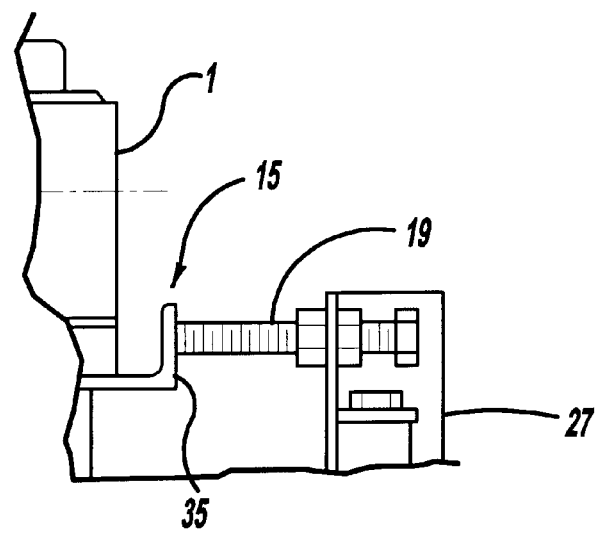
FIGS. 3A–3C show an exemplary installation sequence in accordance with the invention.
Figure 3B:
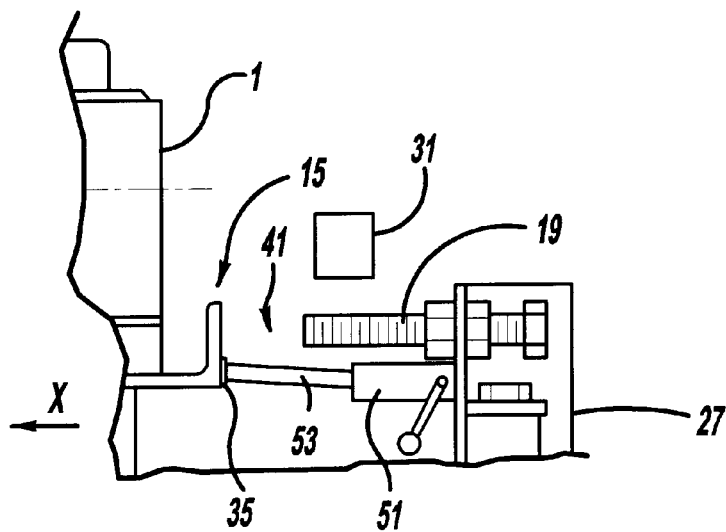
Figure 3C:
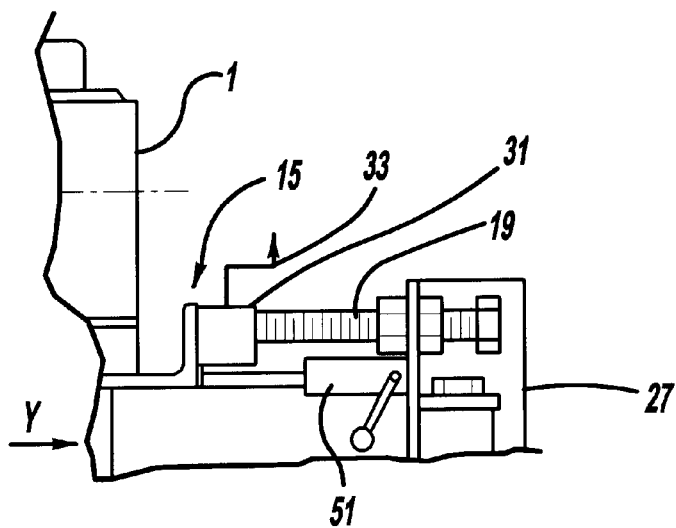

The force sensor 31 is easily installed as part of the conveyor drive, either when first installed or as a retrofit application. Referring now to FIGS. 3A–3C, an exemplary installation sequence is depicted. In FIG. 3A, the compression screw 19 is shown butted against a face 35 of the floating frame 15. In order to install the force sensor 31, a jack 51 or other similar device is positioned between the fixed frame 27 and the face 35. A jack member 53 is extended to move the floating frame 15 in the direction X as shown in FIG. 3B to create a space 41 to receive the force sensor 31. The force sensor 31 is inserted in the space 41 and the jack pressure is released to allow the floating frame 15 to travel in the direction Y as shown in FIG. 3C. As part of the process, the compression screw 19 can be backed off as well to facilitate inserting the force sensor 31 in the space 41. The force sensor 31 is now installed and can be utilized to monitor chain pull force as described above.

The moving of the floating frame 15 as depicted in FIG. 3A can be done while the conveyor drive is still running. Once the jack 51 is removed, the conveyor chain is then momentarily stopped and the drive is manually reversed to remove any chain pull, i.e., a state of zero chain pull. The force now measured by the force sensor 31 is a precompression load at a drive pull of zero, this load used to calibrate a recorder or the like. The precompression load is derived from the spring force against the floating frame 15, the spring force value dependent on spring compression as a result of positioning of the compression screw 19. The greater the distance between the face 35 and the fixed frame 27 as determined by adjusting the compression screw 19, the higher the precompression load will be, i.e. more compression of the spring 21.

The drive is then restarted and data from the force sensor 31 is recorded. By subtracting the running precompression load measured by the force sensor 31 from the calibrated force, i.e., the precompression load at a drive pull of zero, the actual drive chain pull force can be calculated. For example, when the drive pull is zero, the precompression force on the force sensor 31 can be 5,000 pounds. When the drive pull increases a certain amount, the precompression force will decrease a corresponding amount. The actual chain pull would be derived by subtracting the force measured while the chain is running, e.g., 3,000 pounds, from the precompression force of 5,000 pounds (previously set at a drive pull of zero) to arrive at a drive pull of 2,000 pounds. As described above, this monitoring can be done continually, or at intervals as desired.

Figure 4:
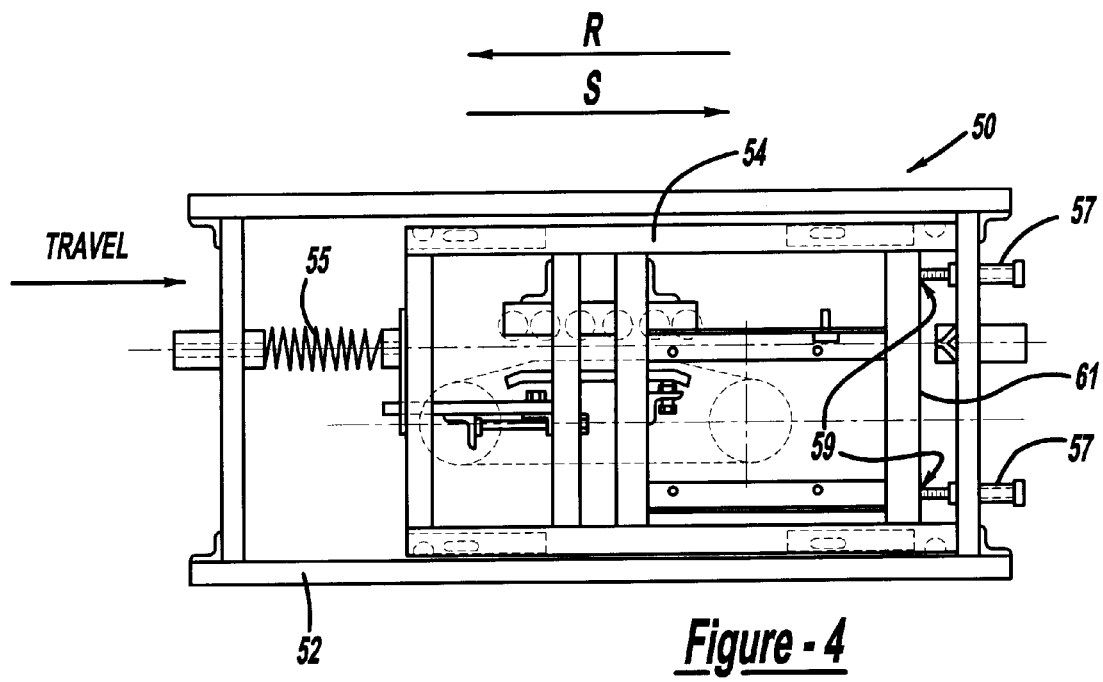
FIG. 4 shows a second embodiment of the invention employing an alternative conveyor drive.

Although a rotary drive is exemplified in FIG. 2, any other drive where chain pull monitoring is important can be utilized. Referring to FIG. 4, a typical linear drive is depicted and designated by the reference numeral 50. The drive includes a fixed frame 52 and a floating frame 54. The floating frame 54 travels longitudinally within the fixed frame 52. As opposed to the rotary drives discussed above, the driving torque is aligned with the direction of chain travel.

The floating frame 54 is fixed by the compression spring 55 forcing the frame 54 against the compression screws 57. A force sensor can be inserted between one or both of the compression screws 57 at 59. The manner of insertion can be the same for the rotary drive wherein the floating frame 54 is moved against the force of the spring 55 to create a space between the one or both of the compression screws 57 and the frame face 61.

Figure 5:
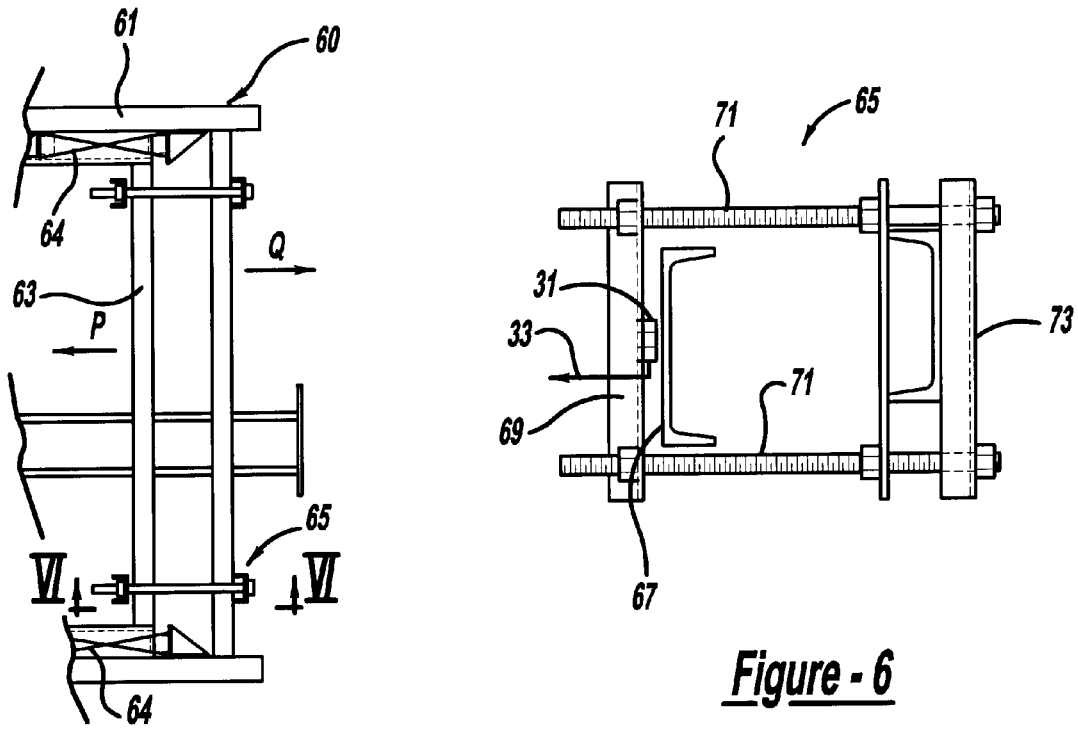
FIG. 5 shows a partial view of yet another embodiment of the invention.
Figure 6:
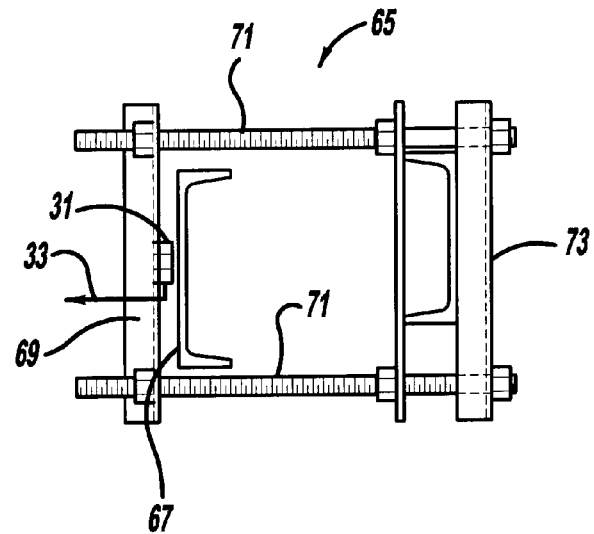
FIG. 6 shows a sectional view along the line VI-VI of FIG. 5.

FIGS. 5 and 6 show yet another embodiment of the invention. In FIG. 5, a portion of a conveyor drive is illustrated and designated by the reference numeral 60, having a fixed frame 61 and a floating frame 63. In this embodiment, the floating frame 63 is biased in the direction Q by springs 64 and the sensed chain pull is in the direction P.

A force sensor assembly 65 mounts the force sensor 31 between a floating frame face 67 and a bracket or plate 69 of the assembly 65. With this arrangement, when the floating frame 63 senses a chain pull force, it contacts the force sensor 31 which is connected to the fixed frame 61 via the force sensor assembly 65. The rods 71 of the assembly 65 link to the fixed frame 61 by a bracket 73.

It should be understood that the mounting arrangements of the force sensor with respect to the fixed and floating frames can vary depending on the particular configuration of the drive being modified, retrofitted or customized.

Any force sensor as known in the art can be used for monitoring the chain pull force as part of the improved conveyor drives of the invention. A preferred type is a load cell type but other types as would be within the skill of the art can also be utilized.

As such, an invention has been disclosed in terms of preferred embodiments thereof which fulfills each and every one of the objects of the present invention as set forth above and provides new and improved method and apparatus for monitoring the chain pull or tension in connection with a chain drive.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A conveyor drive comprising:
   a fixed frame;
   a floating frame operatively associated with the fixed frame, the floating frame supporting a conveyor drive unit;
   a spring biasing the floating frame against the fixed frame; and
   a force sensor arranged in opposition to the spring, wherein the force sensor senses a force generated by drive operation, wherein installation of the force sensor does not require disassembly and assembly of the spring.

2. The drive of claim 1, wherein the floating frame is a rotary type pivoting on an axis when subjected to chain pull.

3. The drive of claim 1, wherein the floating frame is a linear type moving longitudinally when subjected to chain pull.

4. The drive of claim 1, wherein the force sensor is a load cell sensor.

5. The drive of claim 1, wherein the force sensor is disposed between the floating frame and the fixed frame.

6. The drive of claim 1, further comprising a clamp assembly mounted to the fixed frame, the force sensor arranged between a portion of the clamp assembly and the floating frame.

7. The drive of claim 6, wherein the clamp assembly comprises a clamp plate, the force sensor arranged between the clamp plate and the floating frame.

8. The drive of claim 1, wherein the force sensed by the force sensor includes the spring force minus the force generated by drive operation.

9. A method of monitoring chain pull in a conveyor system employing a conveyor drive including a fixed frame and a floating frame, the floating frame supporting a conveyor drive unit and being biased against the fixed frame by a spring to oppose a force generated by drive operation, comprising:

a) measuring the force generated by drive operation using a force sensor arranged in opposition to the spring, wherein installation of force sensor does not require disassembly and assembly of the spring; and b) monitoring chain pull using the force sensor.

10. The method of claim 9, wherein the floating frame is pivotable about an axis with respect to the fixed frame.

11. The method of claim 9, wherein the floating frame has a longitudinal axis and the floating frame is moveable along the longitudinal axis.

12. The method of claim 9, wherein the monitoring step further comprises storing data representing the measured chain pull in electronic form.

13. The method of claim 9, comprising compressing the spring to create a space between the floating frame and the fixed frame, inserting the force sensor in the space, and decompressing the spring.

14. The method of claim 13, comprising running the conveyor drive during the compressing, inserting and decompressing steps.

15. The method of claim 14, comprising stopping the conveyor drive after force sensor insertion, measuring a force on the force sensor from the spring as a precompression force, and using the precompression force as a base value for calculating the operating chain pull by subtracting the chain pull measured by the force sensor during conveyor drive operation from the base value.

16. The method of claim 9, wherein the force sensor is arranged between the floating frame and the fixed frame.

17. The method of claim 9, wherein the force sensor is held in place on a surface of the floating frame by the fixed frame.

18. The method of claim 9, wherein the force sensor is held in place on a surface of the floating frame by a clamp assembly, the clamp assembly connected to the fixed frame.

19. The drive of claim 1, wherein the force sensor is set to zero when the force generated by the drive operation is zero.

20. A conveyor drive comprising:

a fixed frame;

a floating frame operatively associated with the fixed frame, the floating frame supporting a conveyor drive unit;

a spring biasing the floating frame against the fixed frame; and a force sensor disposed between the fixed frame and the floating frame, wherein the force sensed by the force sensor includes the spring force minus the force generated by drive operation.

21. The conveyor drive of claim 20, including a compression screw connected to the fixed frame with the force sensor being disposed between the compression screw and the floating frame.

* * * * *